(12) United States Patent
Yang et al.

(10) Patent No.: US 12,479,745 B2
(45) Date of Patent: Nov. 25, 2025

(54) METHOD FOR TREATING POLLUTED ACIDIC WASTEWATER FROM SMELTING WITH ACTIVATED PYRITE CONCENTRATE

(71) Applicant: KUNMING METALLURGICAL RESEARCH INSTITUTE CO., LTD., Kunming (CN)

(72) Inventors: Yong Yang, Kunming (CN); Keyuan Sun, Kunming (CN); Weiwei Liu, Kunming (CN); Xingyong Qin, Kunming (CN); Huajun Chen, Kunming (CN); Guohuan Xiong, Kunming (CN); Yanbing Liu, Kunming (CN); Wei Zou, Kunming (CN); Hongxu Zhu, Kunming (CN); Anlei Yue, Kunming (CN); Sen Yan, Kunming (CN); Weizhi Diao, Kunming (CN)

(73) Assignee: KUNMING METALLURGICAL RESEARCH INSTITUTE CO., LTD., Kunming (CN)

( * ) Notice: Subject to any disclaimer, the term of this patent is extended or adjusted under 35 U.S.C. 154(b) by 0 days.

(21) Appl. No.: 19/237,046

(22) Filed: Jun. 13, 2025

(65) Prior Publication Data

US 2025/0304476 A1 Oct. 2, 2025

Related U.S. Application Data

(63) Continuation of application No. PCT/CN2024/135092, filed on Nov. 28, 2024.

(30) Foreign Application Priority Data

Jan. 2, 2024 (CN) .......................... 202410002536.0

(51) Int. Cl.
| | |
|---|---|
| C02F 1/66 | (2023.01) |
| C01G 49/12 | (2006.01) |
| C02F 1/36 | (2023.01) |
| C02F 1/52 | (2023.01) |
| C02F 1/00 | (2023.01) |
| C02F 103/16 | (2006.01) |

(52) U.S. Cl.
CPC ............... *C02F 1/66* (2013.01); *C01G 49/12* (2013.01); *C02F 1/36* (2013.01); *C02F 1/5236* (2013.01); *C01P 2006/80* (2013.01); *C02F 2001/007* (2013.01); *C02F 2103/16* (2013.01); *C02F 2209/02* (2013.01); *C02F 2209/06* (2013.01); *C02F 2209/22* (2013.01); *C02F 2209/44* (2013.01); *C02F 2301/026* (2013.01); *C02F 2305/00* (2013.01)

(58) Field of Classification Search
None
See application file for complete search history.

(56) References Cited

FOREIGN PATENT DOCUMENTS

| | | | |
|---|---|---|---|
| CN | 104150642 A | | 11/2014 |
| CN | 104445733 A | | 3/2015 |
| CN | 104843847 A | * | 8/2015 |
| CN | 106006766 A | | 10/2016 |
| CN | 106277266 A | | 1/2017 |
| CN | 115818817 A | * | 3/2023 |
| CN | 117819758 A | | 4/2024 |
| JP | 4329946 B1 | | 9/2009 |

OTHER PUBLICATIONS

MT 104843847 (Year: 2015).*
MT 115818817 (Year: 2023).*
GB 25466-2010: Emission standard of pollutants for lead and zinc industry, China National Standards, 2010, pp. 1-8, Ministry of Environmental Protection, General Administration of Quality Supervision, Inspection and Quarantine of the People's Republic of China.
GB 25466-2010/XG1-2013: Amendment to Emission Standard of Pollutants for Lead and Zinc Industry (GB 25466-2010), China National Standards, 2013, pp. 1, Ministry of Environmental Protection, General Administration of Quality Supervision, Inspection and Quarantine of the People's Republic of China.
GB 25466-2010/XG2-2020: Amendment to Emission Standard of Pollutants for Lead and Zinc Industry (GB 25466-2010), China National Standards, 2020, pp. 5-7, Ministry of Environmental Protection, General Administration of Quality Supervision, Inspection and Quarantine of the People's Republic of China.
GB 25467-2010: Emission standard of pollutants for copper, nickel, cobalt industry, China National Standards, 2010, pp. 1-10, Ministry of Environmental Protection and General Administration of Quality Supervision, Inspection and Quarantine of the People's Republic of China.
GB 25467-2010/XG1-2013: Amendment to Emission standard of pollutants for copper, nickel, cobalt industry, China National Standards, 2013, pp. 1, Ministry of Environmental Protection and General Administration of Quality Supervision, Inspection and Quarantine of the People's Republic of China.

* cited by examiner

*Primary Examiner* — Peter Keyworth
(74) *Attorney, Agent, or Firm* — Bayramoglu Law Offices LLC

(57) ABSTRACT

A method for treating polluted acidic wastewater from smelting with an activated pyrite concentrate includes: drying and grinding a pyrite concentrate, and washing twice to produce a washed pyrite concentrate powder; mixing the washed pyrite concentrate powder with a $Na_2S$ powder to produce a mixed powder, and adding purified water; allowing a reaction for 3.5 h to 4.5 h; filtering to produce an activated pyrite concentrate; subjecting the activated pyrite concentrate to aeration and standing, drying, and grinding to produce an activated pyrite concentrate powder; adding a lime slurry to the wastewater to adjust a pH; adding the activated pyrite concentrate powder, and allowing an ultrasonic treatment, continuous stirring is conducted; allowing a settlement to produce a first supernatant; adding a lime slurry to the first supernatant to adjust a pH; further allowing a settlement to produce a second supernatant; and separating the second supernatant.

9 Claims, No Drawings

METHOD FOR TREATING POLLUTED ACIDIC WASTEWATER FROM SMELTING WITH ACTIVATED PYRITE CONCENTRATE

CROSS REFERENCE TO THE RELATED APPLICATIONS

This application is a continuation application of International Application No. PCT/CN2024/135092, filed on Nov. 28, 2024, which is based upon and claims priority to Chinese Patent Application No. 202410002536.0, filed on Jan. 2, 2024, the entire contents of which are incorporated herein by reference.

TECHNICAL FIELD

The present disclosure belongs to the technical field of treating wastewater from smelting, and specifically relates to a method for treating polluted acidic wastewater from smelting with an activated pyrite concentrate.

BACKGROUND

In workshops for smelting, a large amount of polluted acidic wastewater is produced from the smelting of copper, lead, zinc, etc., with a flue gas, which is characterized by high acidity, high heavy metal and fluoride concentrations, complex composition, large volatility, and high toxicity. Consequently, treating polluted acid among all types of smelting wastewater is most challenging. Currently, the main methods for treating acid pollution are a lime neutralization process, a high-density sludge process, a sulfidation process, a lime+iron salt (aluminum salt) process, an electrochemical process, a biological agent process, a membrane process, or a combination of two or more of the above processes. According to the Emission Standards for Pollutants in Lead and Zinc Industry (GB 25466-2010) and amendments thereto, for the direct emission of wastewater from lead-zinc smelting workshops or production facilities, the concentration of total thallium should be less than or equal to 0.017 mg/L, and the chemical oxygen demand measured using the dichromate method ($COD_{Cr}$) should be less than or equal to 60 mg/L. According to the Emission Standards for Pollutants in Copper, Nickel, and Cobalt Industry (GB 25467-2010), for the direct emission of wastewater from copper pyrometallurgy, the $COD_{Cr}$ should be less than or equal to 60 mg/L.

Except for the reverse osmosis membrane, the above methods generally cannot make the total thallium concentration and $COD_{Cr}$ meet the emission standards. In addition, these methods often have disadvantages such as high treatment costs, poor effects, generation of residues in large quantities, and being difficult to recycle. Therefore, there is an urgent need to develop an economical treatment method.

Pyrite concentrate is a by-product of the beneficiation of non-ferrous metal ores. Pyrite concentrate can serve as a raw material for sulfuric acid manufacturers. In 2020, the output of pyrite concentrate in China reached 13,250,000 tons, which was priced at about 450 yuan/ton. The current research on the treatment of wastewater with pyrite concentrate primarily focuses on the combination of pyrite concentrate with a strong oxidant to remove organic matter or the preparation of a flocculant and an adsorbent to remove one or two of arsenic, cadmium, chromium, lead, etc. in wastewater. However, there have been no reports on the study of treating various pollutants in polluted acidic wastewater with pyrite concentrate. Based on this, a method for activating pyrite concentrate is proposed, and the activated pyrite concentrate is used to treat polluted acidic wastewater from smelting. Accordingly, most metals in the wastewater form metal sulfide precipitates and are removed, thallium forms TlS and $Tl(OH)_3$ and then are removed through two-stage precipitation, and $COD_{Cr}$ is eliminated through advanced oxidation by the activated pyrite concentrate. The treated polluted acidic wastewater meets the Chinese emission standards. It can be seen that this method demonstrates significant potential for widespread application.

SUMMARY

An objective of the present disclosure is to provide a method for treating polluted acidic wastewater from smelting with an activated pyrite concentrate.

The objective of the present disclosure is achieved as follows: The method for treating polluted acidic wastewater from smelting with an activated pyrite concentrate includes a pyrite concentrate pretreatment, pyrite concentrate activation, and an polluted acidic wastewater treatment, and specifically includes:

A, the pyrite concentrate pretreatment: drying and grinding a pyrite concentrate to produce a pyrite concentrate powder, and washing the pyrite concentrate powder twice with purified water and absolute ethanol successively to produce a washed pyrite concentrate powder for later use, where the pyrite concentrate includes the following components: 42.56% to 48.95% of Fe, 43.28% to 49.26% of S, 3.0% or less of $SiO_2$, 1.12% or less of Zn, and 0.44% or less of Pb;

B, the pyrite concentrate activation: thoroughly mixing the washed pyrite concentrate powder and a $Na_2S$ powder in a mass ratio of 10:(1-2) to produce a mixed powder; feeding the mixed powder into a reactor, and adding purified water, where a mass-to-volume ratio of the mixed powder to the purified water is (400-500) g:1,000 mL; allowing a reaction for 3.5 h to 4.5 h at 105° C. to 115° C., 0.3 MPa to 0.5 MPa, and 160 r/min to 200 r/min, and naturally cooling to room temperature to produce a reaction solution; filtering the reaction solution to produce an activated pyrite concentrate; and subjecting the activated pyrite concentrate to aeration and standing, drying, and grinding to produce an activated pyrite concentrate powder for later use, where the activated pyrite concentrate powder includes the following components: 37.28% to 42.56% of Fe, 42.64% to 48.54% of S, 4.76% to 8.65% of Na, 2.35% or less of $SiO_2$, 0.97% or less of Zn, and 0.38% or less of Pb; and C, the polluted acidic wastewater treatment: adding a lime slurry to the wastewater to adjust a pH of the polluted acidic wastewater to 2.0 to 4.0; adding the activated pyrite concentrate powder at an amount of 12.0 g to 20.0 g per 1.0 L of the wastewater, and allowing an ultrasonic treatment at an ultrasonic frequency of 25 kHz to 28 kHz, where a temperature of the wastewater is maintained at 28° C. to 32° C., continuous stirring is conducted at a rotational speed of 140 r/min to 180 r/min for 5 h to 6 h, and a dissolved oxygen content of the wastewater is maintained at 10.0 mg/L to 15.0 mg/L; allowing a static settlement for 30 min to 60 min to produce a first supernatant; adding a lime slurry to the first supernatant to adjust a pH to 8.0 to 9.0; further allowing a static settlement for 30 min to 60 min to produce a second supernatant; and centrifuging the second supernatant to obtain final treated water.

Technical principles of the present disclosure:

During an oxidation process of pyrite concentrate, dissolved oxygen is adsorbed on the surface of pyrite concentrate and produces $H_2O_2$ based on the two-electron reduction mechanism, and $H_2O_2$ is then desorbed from the mineral surface and enters a solution to produce ·OH through the Fenton reaction. While $Fe^{2+}$ is oxidized into $Fe^{3+}$ by $O_2$, $O_2^{·-}$ is generated. When $O_2^{·-}$ oxidizes $Fe^{2+}$ into $Fe^{3+}$, $H_2O_2$ and ·OH are produced. The activation of pyrite concentrate with $Na_2S$ can increase the generation of $S^{2-}$, polysulfides, etc. on the surface of pyrite concentrate. The generation of polysulfides will promote the decomposition of $H_2O_2$ into ·OH, thereby significantly increasing the reaction rate. ·OH and $O_2^{·-}$ in a solution are the main active substances for removing organic pollutants (namely, $COD_{Cr}$).

In polluted acidic wastewater, thallium exists in the forms of $Tl^+$ and $Tl^{3+}$, and stably exists mainly in the form of $Tl^+$. Most of the elements such as $Tl^+$, $As^{3+}$, $Hg^{2+}$, $Cd^{2+}$, $Pb^{2+}$, $Zn^{2+}$, and $Cu^{2+}$ in polluted acidic wastewater are removed by generating metal sulfide precipitates. $Tl^+$ is rapidly oxidized into $Tl^{3+}$ under the strong combined oxidation of $H_2O_2$, ·OH, and $O_2^{·-}$, and reacts with $OH^-$ together with $Cd^{2+}$, $Pb^{2+}$, $Zn^{2+}$, $Cu^{2+}$, $Fe^{3+}$, etc. to produce metal hydroxide precipitates, thereby achieving the further removal. $F^-$ reacts with a lime slurry to produce a $CaF_2$ precipitate to be removed. The activated pyrite concentrate will produce trivalent iron oxide and hydroxide particles during a reaction process, which induce a coagulation-coprecipitation effect during the removal of heavy metals to further improve the removal efficiency of pollutants.

Compared with the prior art, the present disclosure has the following beneficial effects:

1. In the technical solution of the present disclosure, a pretreated pyrite concentrate powder is activated with $Na_2S$, which is simple, efficient, safe, and economical.
2. While efficiently removing thallium and organic pollutants (namely, $COD_{Cr}$) from polluted acidic wastewater, the activated pyrite concentrate powder can effectively eliminate arsenic, mercury, cadmium, lead, zinc, copper, fluorides, etc. synchronously. The polluted acidic wastewater treated with the activated pyrite concentrate powder can meet the requirements in the Emission Standards for Pollutants in Lead and Zinc Industry (GB 25466-2010) and amendments thereto and the Emission Standards for Pollutants in Copper, Nickel, and Cobalt Industry (GB 25467-2010).
3. The technical solution of the present disclosure demonstrates strong adaptability to varying water qualities, and involves a short process flow, a low operating cost, and a prominent treatment effect when used for treating polluted acidic wastewater.
4. An activated pyrite concentrate powder sediment produced after an polluted acidic wastewater treatment exhibits excellent dewatering performance, and can be recycled as a pyrite concentrate raw material.

DETAILED DESCRIPTION OF THE EMBODIMENTS

The present disclosure is further described below, but is not limited in any way. Any transformation or replacement made based on the teachings of the present disclosure falls within the protection scope of the present disclosure.

The present disclosure provides a method for treating polluted acidic wastewater from smelting with an activated pyrite concentrate, including a pyrite concentrate pretreatment, pyrite concentrate activation, and a polluted acidic wastewater treatment, and specifically including:

A. Pyrite concentrate pretreatment: A pyrite concentrate is dried and ground to produce a pyrite concentrate powder, and the pyrite concentrate powder is washed twice with purified water and absolute ethanol successively to produce a washed pyrite concentrate powder for later use. The pyrite concentrate includes the following components: 42.56% to 48.95% of Fe, 43.28% to 49.26% of S, 3.0% or less of $SiO_2$, 1.12% or less of Zn, and 0.44% or less of Pb.

B. Pyrite concentrate activation: The washed pyrite concentrate powder and a Na2S powder are thoroughly mixed in a mass ratio of 10:(1-2) to produce a mixed powder. The mixed powder is fed into a reactor, and purified water is added. A mass-to-volume ratio of the mixed powder to the purified water is (400-500) g:1,000 mL. A reaction is allowed for 3.5 h to 4.5 h at 105° C. to 115° C., 0.3 MPa to 0.5 MPa, and 160 r/min to 200 r/min, and natural cooling is then conducted to room temperature to produce a reaction solution. The reaction solution is filtered to produce an activated pyrite concentrate. The activated pyrite concentrate is aerated and allowed to stand, dried, and ground to produce an activated pyrite concentrate powder for later use. The activated pyrite concentrate powder includes the following components: 37.28% to 42.56% of Fe, 42.64% to 48.54% of S, 4.76% to 8.65% of Na, 2.35% or less of $SiO_2$, 0.97% or less of Zn, and 0.38% or less of Pb.

C. Polluted acidic wastewater treatment: A lime slurry is added to the polluted acidic wastewater to adjust a pH of the wastewater to 2.0 to 4.0. The activated pyrite concentrate powder is added at an amount of 12.0 g to 20.0 g per 1.0 L of the wastewater, and an ultrasonic treatment is allowed at an ultrasonic frequency of 25 kHz to 28 kHz, where a temperature of the wastewater is maintained at 28° C. to 32° C., continuous stirring is conducted at a rotational speed of 140 r/min to 180 r/min for 5 h to 6 h, and a dissolved oxygen content of the wastewater is maintained at 10.0 mg/L to 15.0 mg/L. A static settlement is allowed for 30 min to 60 min to produce a first supernatant. A lime slurry is added to the first supernatant to adjust a pH to 8.0 to 9.0. A static settlement is further allowed for 30 min to 60 min to produce a second supernatant. The second supernatant is centrifuged to obtain final treated water.

During the pyrite concentrate pretreatment, the pyrite concentrate is a by-product from a beneficiation process of a lead-zinc sulfide ore, the pyrite concentrate is dried at 100° C. to 110° C. for 2.5 h to 3.5 h, and the pyrite concentrate is ground to a particle size of 100 mesh.

During the pyrite concentrate activation, the activated pyrite concentrate is aerated and allowed to stand at 30° C. to 35° C. for 24 h, an activated pyrite concentrate produced after the aeration and standing is dried at 105° C. for 3 h, and a dried activated pyrite concentrate produced is ground to a particle size of 200 mesh.

During the polluted acidic wastewater treatment, the temperature of the wastewater is maintained by heating with solar energy or heating with waste heat of a flue gas. Concentration indexes of various pollutants in the treated water are as follows: thallium≤0.004 mg/L, arsenic≤0.18 mg/L, mercury≤0.001 mg/L, cadmium≤0.012 mg/L, lead≤0.065 mg/L, zinc≤0.68 mg/L, copper≤0.17 mg/L, $COD_{Cr}$≤52.87 mg/L, and fluoride≤4.56 mg/L.

Example 1

In all of the following examples, a pH value was determined by a glass electrode method, thallium, arsenic, cadmium, lead, zinc, and copper were determined by inductively coupled plasma atomic emission spectroscopy, mercury was determined by cold vapor atomic absorption spectrometry, a chemical oxygen demand ($COD_{Cr}$) was determined by a dichromate method, and a fluoride ion was determined by an ion-selective electrode method.

The direct emission concentration limits for water pollutants from new enterprises specified in the Emission Standards for Pollutants in Lead and Zinc Industry (GB 25466-2010) and amendments thereto and the Emission Standards for Pollutants in Copper, Nickel, and Cobalt Industry (GB 25467-2010) were shown in Table 1.

TABLE 1

Direct emission concentration limits for water pollutants from new enterprises
Unit: mg/L (except for pH)

| Pollutant standards | pH | Total thallium | Total arsenic | Total mercury | Total cadmium | Total lead | Total zinc | Total copper | CODCr | Fluoride |
|---|---|---|---|---|---|---|---|---|---|---|
| Emission Standards for Pollutants in Lead and Zinc Industry | 6-9 | 0.017 | 0.3 | 0.03 | 0.05 | 0.5 | 1.5 | 0.5 | 60 | 8 |
| Emission Standards for Pollutants in Copper, Nickel, and Cobalt Industry | 6-9 | — | 0.5 | 0.05 | 0.1 | 0.5 | 1.5 | 0.5 | 60 | 5 |

A. Pyrite concentrate pretreatment: A pyrite concentrate was dried at 105° C. for 3 h and ground to a particle size of 100 mesh to produce a pyrite concentrate powder. The pyrite concentrate powder was washed twice with purified water and absolute ethanol successively to produce a washed pyrite concentrate powder for later use. The pyrite concentrate included the following components: 42.56% of Fe, 45.72% of S, 2.8% of $SiO_2$, 1.12% of Zn, and 0.38% of Pb.

B. Pyrite concentrate activation: The washed pyrite concentrate powder and a $Na_2S$ powder were thoroughly mixed in a mass ratio of 10:1.5 to produce a mixed powder. The mixed powder was fed into a reactor, and purified water was added. A mass-to-volume ratio of the mixed powder to the purified water was 450 g:1,000 mL. A reaction was allowed for 4 h at 110° C., 0.4 MPa, and 180 r/min, and natural cooling was then conducted to room temperature to produce a reaction solution. The reaction solution was filtered to produce an activated pyrite concentrate. The activated pyrite concentrate was aerated and allowed to stand at 30° C. to 32° C. for 24 h, dried at 105° C. for 3 h, and ground to a particle size of 200 mesh to produce an activated pyrite concentrate powder for later use. The activated pyrite concentrate powder included the following components: 37.28% of Fe, 45.05% of S, 6.71% of Na, 2.24% of $SiO_2$, 0.97% of Zn, and 0.32% of Pb.

C. Polluted acidic wastewater treatment: 10 L of polluted acidic wastewater from lead smelting was taken and placed in a barrel, and allowed to stand for 24 h to achieve a settlement. A resulting supernatant was collected and tested. Test results were as follows: acidity: 78.89 g/L, thallium: 3.28 mg/L, arsenic: 28.35 mg/L, mercury: 0.87 mg/L, cadmium: 1.53 mg/L, lead: 6.24 mg/L, zinc: 57.26 mg/L, copper: 5.64 mg/L, $COD_{Cr}$: 98.65 mg/L, and fluoride ion: 789 mg/L.

A lime slurry was added to the polluted acidic wastewater to adjust a pH of the wastewater to 2.0. The activated pyrite concentrate powder was added at an amount of 12.0 g per 1.0 L of the wastewater, and an ultrasonic treatment was allowed at an ultrasonic frequency of 25 kHz, where a temperature of the wastewater was maintained at 28° C. by heating with waste heat of a flue gas, continuous stirring was conducted at a rotational speed of 140 r/min for 5 h, and a dissolved oxygen content of the wastewater was maintained at 10.0 mg/L. A static settlement was allowed for 30 min to produce a first supernatant. A lime slurry was added to the first supernatant to adjust a pH to 8.0. A static settlement was further allowed for 30 min to produce a second supernatant. The second supernatant was centrifuged to obtain final treated water. Concentration indexes of various pollutants in the treated water were as follows: thallium: 0.004 mg/L, arsenic: 0.18 mg/L, mercury: 0.001 mg/L, cadmium: 0.012 mg/L, lead: 0.056 mg/L, zinc: 0.68 mg/L, copper: 0.098 mg/L, $COD_{Cr}$: 49.85 mg/L, and fluoride: 4.56 mg/L, which were lower than the emission concentration limits for water pollutants from new enterprises specified in GB 25466-2010 shown in Table 1, respectively.

Example 2

A. Pyrite concentrate pretreatment: A pyrite concentrate was dried at 110° C. for 2.5 h and ground to a particle size of 100 mesh to produce a pyrite concentrate powder. The pyrite concentrate powder was washed twice with purified water and absolute ethanol successively to produce a washed pyrite concentrate powder for later use. The pyrite concentrate included the following components: 44.32% of Fe, 49.26% of S, 2.7% of $SiO_2$, 1.05% of Zn, and 0.44% of Pb.

B. Pyrite concentrate activation: The washed pyrite concentrate powder and a $Na_2S$ powder were thoroughly mixed in a mass ratio of 10:1 to produce a mixed powder. The mixed powder was fed into a reactor, and purified water was added. A mass-to-volume ratio of the mixed powder to the purified water was 400 g:1,000 mL. A reaction was allowed for 4.5 h at 105° C., 0.3 MPa, and 200 r/min, and natural cooling was then conducted to room temperature to produce a reaction solution. The reaction solution was filtered to produce an activated pyrite concentrate. The activated pyrite concentrate was aerated and allowed to stand at 32° C. to 34° C. for 24 h, dried at 105° C. for 3 h, and ground to a particle size of 200 mesh to produce an activated pyrite concentrate powder for later use. The activated pyrite concentrate powder included the following components: 38.54% of Fe, 48.54% of S, 4.76% of Na, 2.10% of $SiO_2$, 0.82% of Zn, and 0.38% of Pb.

C. Polluted acidic wastewater treatment: Polluted acidic wastewater from lead smelting to be treated was the same as that in Example 1.

A lime slurry was added to the polluted acidic wastewater to adjust a pH of the wastewater to 4.0. The activated pyrite concentrate powder was added at an amount of 20.0 g per 1.0 L of the wastewater, and an ultrasonic treatment was allowed at an ultrasonic frequency of 28 kHz, where a temperature of the wastewater was maintained at 32° C. by heating with solar energy, continuous stirring was conducted at a rotational speed of 150 r/min for 6 h, and a dissolved oxygen content of the wastewater was maintained at 12.0 mg/L. A static settlement was allowed for 60 min to produce a first supernatant. A lime slurry was added to the first supernatant to adjust a pH to 9.0. A static settlement was further allowed for 60 min to produce a second supernatant. The second supernatant was centrifuged to obtain final treated water. Concentration indexes of various pollutants in the treated water were as follows: thallium: 0.002 mg/L, arsenic: 0.16 mg/L, mercury: 0.0008 mg/L, cadmium: 0.011 mg/L, lead: 0.052 mg/L, zinc: 0.63 mg/L, copper: 0.083 mg/L, $COD_{Cr}$: 42.85 mg/L, and fluoride: 4.23 mg/L, which were lower than the emission concentration limits for water pollutants from new enterprises specified in GB 25466-2010 shown in Table 1, respectively.

Example 3

A. Pyrite concentrate pretreatment: A pyrite concentrate was dried at 100° C. for 3.5 h and ground to a particle size of 100 mesh to produce a pyrite concentrate powder. The pyrite concentrate powder was washed twice with purified water and absolute ethanol successively to produce a washed pyrite concentrate powder for later use. The pyrite concentrate included the following components: 48.95% of Fe, 47.34% of S, 2.9% of $SiO_2$, 0.85% of Zn, and 0.29% of Pb.

B. Pyrite concentrate activation: The washed pyrite concentrate powder and a $Na_2S$ powder were thoroughly mixed in a mass ratio of 10:2 to produce a mixed powder. The mixed powder was fed into a reactor, and purified water was added. A mass-to-volume ratio of the mixed powder to the purified water was 500 g:1,000 mL. A reaction was allowed for 3.5 h at 115° C., 0.5 MPa, and 160 r/min, and natural cooling was then conducted to room temperature to produce a reaction solution. The reaction solution was filtered to produce an activated pyrite concentrate. The activated pyrite concentrate was aerated and allowed to stand at 33° C. to 35° C. for 24 h, dried at 105° C. for 3 h, and ground to a particle size of 200 mesh to produce an activated pyrite concentrate powder for later use. The activated pyrite concentrate powder included the following components: 42.56% of Fe, 46.65% of S, 8.65% of Na, 2.28% of $SiO_2$, 0.69% of Zn, and 0.26% of Pb.

C. Polluted acidic wastewater treatment: 10 L of polluted acidic wastewater from copper smelting was taken and placed in a barrel, and allowed to stand for 24 h to achieve a settlement. A resulting supernatant was collected and tested. Test results were as follows: acidity: 86.52 g/L, thallium: 2.69 mg/L, arsenic: 17.16 mg/L, mercury: 0.27 mg/L, cadmium: 1.87 mg/L, lead: 9.98 mg/L, zinc: 30.16 mg/L, copper: 37.04 mg/L, $COD_{Cr}$: 105.86 mg/L, and fluoride ion: 586 mg/L.

A lime slurry was added to the polluted acidic wastewater to adjust a pH of the wastewater to 2.0. The activated pyrite concentrate powder was added at an amount of 12.0 g per 1.0 L of the wastewater, and an ultrasonic treatment was allowed at an ultrasonic frequency of 25 kHz, where a temperature of the wastewater was maintained at 28° C. by heating with waste heat of a flue gas, continuous stirring was conducted at a rotational speed of 160 r/min for 5 h, and a dissolved oxygen content of the wastewater was maintained at 13.0 mg/L. A static settlement was allowed for 30 min to produce a first supernatant. A lime slurry was added to the first supernatant to adjust a pH to 8.0. A static settlement was further allowed for 30 min to produce a second supernatant. The second supernatant was centrifuged to obtain final treated water. Concentration indexes of various pollutants in the treated water were as follows: thallium: 0.003 mg/L, arsenic: 0.12 mg/L, mercury: 0.0006 mg/L, cadmium: 0.010 mg/L, lead: 0.065 mg/L, zinc: 0.52 mg/L, copper: 0.17 mg/L, $COD_{Cr}$: 52.87 mg/L, and fluoride: 4.17 mg/L, which were lower than the emission concentration limits for water pollutants from new enterprises specified in GB 25466-2010 shown in Table 1, respectively.

Example 4

A. Pyrite concentrate pretreatment: A pyrite concentrate was dried at 105° C. for 3 h and ground to a particle size of 100 mesh to produce a pyrite concentrate powder. The pyrite concentrate powder was washed twice with purified water and absolute ethanol successively to produce a washed pyrite concentrate powder for later use. The pyrite concentrate included the following components: 46.75% of Fe, 43.28% of S, 3.0% of $SiO_2$, 0.98% of Zn, and 0.32% of Pb.

B. Pyrite concentrate activation: The washed pyrite concentrate powder and a $Na_2S$ powder were thoroughly mixed in a mass ratio of 10:1.5 to produce a mixed powder. The mixed powder was fed into a reactor, and purified water was added. A mass-to-volume ratio of the mixed powder to the purified water was 460 g:1,000 mL. A reaction was allowed for 4 h at 112° C., 0.4 MPa, and 170 r/min, and natural cooling was then conducted to room temperature to produce a reaction solution. The reaction solution was filtered to produce an activated pyrite concentrate. The activated pyrite concentrate was aerated and allowed to stand at 30° C. to 33° C. for 24 h, dried at 105° C. for 3 h, and ground to a particle size of 200 mesh to produce an activated pyrite concentrate powder for later use. The activated pyrite concentrate powder included the following components: 40.65% of Fe, 42.64% of S, 6.71% of Na, 2.35% of $SiO_2$, 0.78% of Zn, and 0.25% of Pb.

C. Polluted acidic wastewater treatment: Polluted acidic wastewater from copper smelting to be treated was the same as that in Example 3.

A lime slurry was added to the polluted acidic wastewater to adjust a pH of the wastewater to 4.0. The activated pyrite concentrate powder was added at an amount of 20.0 g per 1.0 L of the wastewater, and an ultrasonic treatment was allowed at an ultrasonic frequency of 28 kHz, where a temperature of the wastewater was maintained at 32° C. by heating with solar energy, continuous stirring was conducted at a rotational speed of 180 r/min for 6 h, and a dissolved oxygen content of the wastewater was maintained at 15.0 mg/L. A static settlement was allowed for 60 min to produce a first supernatant. A lime slurry was added to the first supernatant to adjust a pH to 9.0. A static settlement was further allowed for 60 min to produce a second supernatant. The second supernatant was centrifuged to obtain final treated water. Concentration indexes of various pollutants in the treated water were as follows: thallium: 0.002 mg/L, arsenic: 0.10 mg/L, mercury: 0.0005 mg/L, cadmium: 0.009 mg/L, lead: 0.057 mg/L, zinc: 0.48 mg/L, copper: 0.15 mg/L, $COD_{Cr}$: 46.75 mg/L, and fluoride: 3.98 mg/L, which were lower than the emission concentration limits for water pollutants from new enterprises specified in GB 25466-2010 shown in Table 1, respectively.

Example 5

1,000.0 g of an activated pyrite concentrate powder sediment produced after the polluted acidic wastewater treatment in Example 2 was weighed, added to each of three beakers, and oven-dried in an oven at 105° C. to a constant weight. Mass changes of the three beakers before and after the oven-drying were measured. An average moisture content of the activated pyrite concentrate powder sediment was calculated to be 75%.

The activated pyrite concentrate powder sediment was subjected to press filtration with a press filter to produce a press filter residue. 100.0 g of the press filter residue was weighed, added to each of three beakers, and oven-dried in an oven at 105° C. to a constant weight. Mass changes of the three beakers before and after the oven-drying were measured. An average moisture content of the press filter residue was calculated to be 23%.

It can be seen that the activated pyrite concentrate powder sediment has excellent dewatering performance. Elemental analysis was conducted by X-ray fluorescence spectroscopy. According to results, a dry press filter residue includes 41.50% of Fe and 44.26% of S, and can be recycled as a pyrite concentrate raw material.

What is claimed is:

1. A method for treating a polluted acidic wastewater from a smelting with an activated pyrite concentrate, comprising:
   A, a pyrite concentrate pretreatment: drying and grinding a pyrite concentrate to produce a pyrite concentrate powder, and washing the pyrite concentrate powder twice with purified water and absolute ethanol successively to produce a washed pyrite concentrate powder for a later use, wherein the pyrite concentrate comprises the following components: 42.56% to 48.95% of Fe, 43.28% to 49.26% of S, 3.0% or less of $SiO_2$, 1.12% or less of Zn, and 0.44% or less of Pb;
   B, a pyrite concentrate activation: thoroughly mixing the washed pyrite concentrate powder and a $Na_2S$ powder in a mass ratio of 10:(1-2) to produce a mixed powder; feeding the mixed powder into a reactor, and adding purified water, wherein a mass-to-volume ratio of the mixed powder to the purified water is (400-500) g:1,000 mL; allowing a reaction for 3.5 h to 4.5 h at 105° C. to 115° C., 0.3 MPa to 0.5 MPa, and 160 r/min to 200 r/min, and naturally cooling to a room temperature to produce a reaction solution; filtering the reaction solution to produce the activated pyrite concentrate; and subjecting the activated pyrite concentrate to an aeration and a standing, a drying, and a grinding to produce an activated pyrite concentrate powder for a later use, wherein the activated pyrite concentrate powder comprises the following components: 37.28% to 42.56% of Fe, 42.64% to 48.54% of S, 4.76% to 8.65% of Na, 2.35% or less of $SiO_2$, 0.97% or less of Zn, and 0.38% or less of Pb; and
   C, a polluted acidic wastewater treatment: adding a first lime slurry to the polluted acidic wastewater to adjust a pH of the polluted acidic wastewater to 2.0 to 4.0; adding the activated pyrite concentrate powder at an amount of 12.0 g to 20.0 g per 1.0 L of the polluted acidic wastewater, and allowing an ultrasonic treatment at an ultrasonic frequency of 25 kHz to 28 kHz, wherein a temperature of the polluted acidic wastewater is maintained at 28° C. to 32° C., a continuous stirring is conducted at a rotational speed of 140 r/min to 180 r/min for 5 h to 6 h, and a dissolved oxygen content of the polluted acidic wastewater is maintained at 10.0 mg/L to 15.0 mg/L; allowing a first static settlement for 30 min to 60 min to produce a first supernatant; adding a second lime slurry to the first supernatant to adjust a pH of the first supernatant to 8.0 to 9.0; further allowing a second static settlement for 30 min to 60 min to produce a second supernatant; and centrifuging the second supernatant to obtain a final treated water.

2. The method for treating the polluted acidic wastewater from the smelting with the activated pyrite concentrate according to claim 1, wherein during the pyrite concentrate pretreatment, the pyrite concentrate is a by-product from a beneficiation process of a lead-zinc sulfide ore.

3. The method for treating the polluted acidic wastewater from the smelting with the activated pyrite concentrate according to claim 1, wherein during the pyrite concentrate pretreatment, the pyrite concentrate is dried at 100° C. to 110° C. for 2.5 h to 3.5 h.

4. The method for treating the polluted acidic wastewater from the smelting with the activated pyrite concentrate according to claim 1, wherein during the pyrite concentrate pretreatment, the pyrite concentrate is ground to a particle size of 100 mesh.

5. The method for treating the polluted acidic wastewater from the smelting with the activated pyrite concentrate according to claim 1, wherein during the pyrite concentrate activation, the activated pyrite concentrate is aerated and allowed to stand at 30° C. to 35° C. for 24 h.

6. The method for treating the polluted acidic wastewater from the smelting with the activated pyrite concentrate according to claim 1, wherein during the pyrite concentrate activation, an activated pyrite concentrate produced after the aeration and the standing is dried at 105° C. for 3 h.

7. The method for treating the polluted acidic wastewater from the smelting with the activated pyrite concentrate according to claim 1, wherein during the pyrite concentrate activation, a dried activated pyrite concentrate produced is ground to a particle size of 200 mesh.

8. The method for treating the polluted acidic wastewater from the smelting with the activated pyrite concentrate according to claim 1, wherein during the polluted acidic wastewater treatment, the temperature of the polluted acidic wastewater is maintained by heating with a solar energy or heating with a waste heat of a flue gas.

9. The method for treating the polluted acidic wastewater from the smelting with the activated pyrite concentrate according to claim 1, wherein during the polluted acidic wastewater treatment, concentration indexes of various pollutants in the final treated water are as follows: thallium≤0.004 mg/L, arsenic≤0.18 mg/L, mercury≤0.001 mg/L, cadmium≤0.012 mg/L, lead≤0.065 mg/L, zinc≤0.68 mg/L, copper≤0.17 mg/L, a chemical oxygen demand measured using a dichromate method $(COD_{Cr})$≤52.87 mg/L, and a fluoride≤4.56 mg/L.

\* \* \* \* \*